United States Patent
Amirzadeh-Asl et al.

(10) Patent No.: US 6,660,673 B1
(45) Date of Patent: Dec. 9, 2003

(54) USE OF PARTICULATE MATERIALS CONTAINING TIO₂ IN REFRACTORY PRODUCTS

(75) Inventors: Djamschid Amirzadeh-Asl, Moers (DE); Dieter Fünders, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 133 days.

(21) Appl. No.: 09/624,571

(22) Filed: Jul. 24, 2000

(30) Foreign Application Priority Data

Jul. 22, 1999 (DE) .......................... 199 35 251

(51) Int. Cl.⁷ .................. C04B 35/56; C04B 35/58; C04B 35/103
(52) U.S. Cl. .................. 501/87; 501/91; 501/92; 501/96.1; 501/103; 501/114; 501/128; 501/134
(58) Field of Search .................. 501/128, 87, 88, 501/89, 90, 91, 92, 93, 103, 96.1, 114, 134

(56) References Cited

U.S. PATENT DOCUMENTS

| | | | | | |
|---|---|---|---|---|---|
| 3,808,013 | A | * | 4/1974 | Manigault | 501/128 |
| 4,104,075 | A | * | 8/1978 | Hayashi et al. | 501/128 |
| 5,171,724 | A | * | 12/1992 | Iwadoh et al. | 501/120 |
| 5,807,798 | A | * | 9/1998 | Bolt et al. | 501/94 |
| 5,837,631 | A | * | 11/1998 | Elstner et al. | 501/90 |
| 5,925,585 | A | * | 7/1999 | Schoennahl et al. | 501/98.1 |

FOREIGN PATENT DOCUMENTS

| | | |
|---|---|---|
| EP | 611740 B | 5/1994 |
| GB | 1345878 | 2/1974 |
| GB | 1353563 | 5/1974 |
| JP | 8-231264 | * 9/1996 |

* cited by examiner

*Primary Examiner*—Karl Group
(74) *Attorney, Agent, or Firm*—Fulbright & Jaworski L.L.P.

(57) ABSTRACT

In order to reduce wear on refractory linings due to corrosion and the infiltration of slags and molten metals, particulate materials containing $TiO_2$ are added to the refractory products consisting of a mixture of aggregates and binding agents.

6 Claims, No Drawings

USE OF PARTICULATE MATERIALS CONTAINING $TiO_2$ IN REFRACTORY PRODUCTS

FOREIGN APPLICATION PRIORITY

This application claims priority to German patent application number 19935251.8 entitled "Anwendung $TiO_2$-haltiger partikulärer Materialien für feuerfeste Enzeugrisse", filed Jul. 27, 1999.

DESCRIPTION

The invention relates to the use of particulate materials containing $TiO_2$ as an additive in refractory products consisting of a mixture of aggregate substances and at least one binding agent.

BACKGROUND

Refractory products are based substantially on the six base oxides, $SiO_2$, $Al_2O_3$, MgO, CaO, $Cr_2O_3$ and $ZrO_2$ and on compounds thereof, occasionally in combination with carbon or graphite. As for the carbon, silicon carbide is used and, in small amounts for special applications, boron carbide and nitrides. Refractory products are used for lining large areas of apparatus for thermal processes, such as melting, burning and heating apparatus, as well as transporting vessels, especially in the iron and steel industry, among other things; they are usually installed behind a casing, either as they are or after the addition of liquid, and after they become hard they are used for the seamless casing of apparatus. These unshaped refractory products are divided into refractory concretes, plastic compositions, ramming masses, taphole plugging material, compositions for spray application, mortar, dry compounds, forcing masses and plasters for surface protection. The binding agents are hydraulic curing substances, such as cement, alumina refractory cement and electrofilter ash, as well as inorganic substances curing by chemical reaction.

Refractory linings are subjected to considerable wear and tear by corrosion and infiltration by metallurgical slags and molten metal. Corrosion is caused by chemical attack by the furnace charge, the molten metal, the molten slags and/or the furnace dust. Reaction products form, including eutectic melts, which run down or drip. In the case of infiltration, slags or reaction melts penetrate by capillary forces into the pores of the refractory lining. Due to the temperature gradient present in a refractory lining the melt penetrates into it deeply until it hardens. During solidification, molten substances of a low solidification temperature form which migrate further toward the cold side of the refractory lining. Thus a division occurs into zones of varying chemical and mineralogical composition. A similar zoning develops when components of the melt form mixed crystals with components of the refractory lining and are thereby withdrawn from the melt. As a consequence, cracking and spalling occur when temperature changes occur.

SUMMARY OF THE INVENTION

The present invention is addressed to the problem of improving refractory products, especially unshaped products, especially with regard to consistent material quality and unvarying chemical composition by new combinations of materials, in order thereby to reduce wear due to corrosion and infiltration, and being able to offer tailored solutions of problems.

The solution of this problem is accomplished by the use of particulate materials containing $TiO_2$, as an additive for refractory products consisting of a mixture of aggregate materials and at least one binding agent.

DETAILED DESCRIPTION OF THE INVENTION

Advantageously the particulate materials containing $TiO_2$ have an average grain size $d_{50}$ of 0.2 to 2000 µm, especially 1 to 500 µm.

In the special application of the particulate materials containing $TiO_2$, the amount added, with respect to the $TiO_2$ content, amounts to up to 90 wt.-%, preferably 2 to 50 wt.-% of the mixture.

For an optimal solution of the problem of the invention, the use of synthetic particulate materials containing $TiO_2$ has proven practical.

Up to 90%, preferably up to 70%, of the weight of the added amount of the particulate materials containing $TiO_2$ is replaceable by one or more of the substances: iron oxides, $SiO_2$, $Al_2O_3$, carbon, CaO, MgO, borates and boron oxides.

The use of the particulate materials containing $TiO_2$ is suitable both as an additive for refractory products whose aggregates consists substantially of $Al_2O_3$, $SiO_2$ and aluminum silicates, and as an additive for refractory products whose aggregates are substantially magnesia, dolomite, chrome magnesia, chromium ore and spinel, and for refractory products which contain silicon carbide, silicon nitride, zirconium silicate, zirconium oxide, borates and boron oxide.

For many years it has been known to use materials containing $TiO_2$ to reduce wear and to repair damaged areas in the hearth of blast furnaces.

The reaction products of the titanic materials deposit themselves especially on corroded and eroded areas in the hearth, lead to a build-up of a new protective coating, and thus produce protection against corrosion as well as erosion. For this purpose, natural raw materials, such as ilmenite pieces, ilmenite sand, and synthetic titanium supports are used. Refractory as well as corrosion-resistant titanium compounds are created in the form of nitrides and carbides, which deposit themselves in the damaged areas and produce a socalled "hot repair effect." Also, titanium oxides and the reactions which they trigger increase the viscosity of raw iron, thereby achieving a lowering of the wall temperature and combating wear on the lining.

The use of natural titanium supports is limited as a result of their content of accompanying substances, their inconsistent chemical composition, their undesirable mineralogical composition—$TiO_3$ is in the form of $FeTiO_3$ (ilmenite) and $Fe_2TiO_5$—and their grain size as well as the geometry of their grains.

Synthetic titanium supports have the advantage over natural titanium supports that the amount of $TiO_2$ required is immediately available for the desired reaction, while the more stable ilmenite must first be broken down by the system with the consumption of energy and time before the $TiO_2$ can become physiochemically active. The average particle size $d_{50}$ <100µm of the synthetic titanium supports makes possible the very high reaction kinetics required for the purpose. The iron oxide content of the synthetic titanium support melts at very low temperatures, so that the $TiO_2$ is dissolved in this molten iron droplet. In the presence of elemental carbon or dissolved nitrogen the $TiO_2$ is reduced to dissolved titanium which bonds immediately to dissolved carbon or nitrogen to form titanium carbide, titanium nitride or titanium carbonitride. This reaction is a phase boundary reaction which takes place on the surface of the iron droplet. The separated crystals of titanium carbide, titanium nitride and titanium carbonitride grow until kinetic inhibition is reached. If these droplets fall onto a porous, refractory surface, the wear-resistant titanium compounds are deposited on the surface. The deposited crystals grow increasingly and seal the surface of the refractory material with a dense coating. Due to the fineness of the particles of the synthetic titanium supports the natural pores of the refractory material become largely filled up with synthetic titanium supports, so that any penetration of liquid slag and/or molten metal into these pores is made definitely difficult. If nevertheless molten slags or metals penetrate into the pores, the synthetic titanium supports present react such that, on account of the greatly increasing temperatures, the iron content in the synthetic titanium support fuses, the $TiO_2$ content therein is dissolved and, both due to the carbon content of the base substance and to the carbon carrier admixed with the synthetic titanium support, as described above, reacts to form titanium nitride or titanium carbonitride, as the case may be.

What is claimed is:

1. A refractory composition comprising a mixture of aggregate materials, at least one binding agent and an additive, said additive comprising synthetic particulate $TiO_2$ with an average grain size $d_{avg}$ of 0.2 to 2000 μm in amount up to 90 wt.-% with respect to said aggregate materials, and an iron oxide in an amount us to 70 wt.-%, with respect to said additive, wherein, upon employment, said $TiO_2$ reacts with at least one of nitrogen and carbon, while in contact with iron, to form one or more of titanium carbide, titanium nitride and titanium carbonitride, wherein said aggregate materials are substantially $Al_2O_3$, $SiO_2$, and alumosilicates.

2. A refractory composition comprising a mixture of aggregate materials, at least one binding agent and an additive, said additive comprising synthetic particulate $TiO_2$ with an average grain size $d_{avg}$ of 0.2 to 2000 μm in amount up to 90 wt.-% with respect to said aggregate materials, and an iron oxide in an amount up to 70 wt.-%, with respect to said additive, wherein, upon employment, said $TiO_2$ reacts with at least one of nitrogen and carbon, while in contact with iron, to form one or more of titanium carbide, titanium nitride and titanium carbonitride, wherein said aggregate materials are substantially magnesia, dolomite, chrome magnesia, chromium ore and spinel.

3. A refractory composition comprising a mixture of aggregate materials, at least one binding agent and an additive, said additive comprising synthetic particulate $TiO_2$ with an average grain size $d_{avg}$ of 0.2 to 2000 μm in amount up to 90 wt.-% with respect to said aggregate materials, and an iron oxide in an amount up to 70 wt.-%, with respect to said additive, wherein, upon employment, said $TiO_2$ reacts with at least one of nitrogen and carbon, while in contact with iron, to form one or more of titanium carbide, titanium nitride and titanium carbonitride, wherein said aggregate materials are substantially silicon carbide, silicon nitride, zirconium silicate, zirconium oxide borates and boron oxide.

4. The composition of claim 1, wherein the amount of said $TiO_2$ is 2 to 50wt.-%.

5. The composition of claim 1, wherein said additive further comprises one or more of the substances selected from the group consisting of $SiO_2$, $Al_2O_3$, carbon, CaO, MgO, borates and boron oxides.

6. The composition of claim 2, wherein the amount of said $TiO_2$ is 2 to 50 wt.-%.

* * * * *